US012160386B2

(12) United States Patent
Taherzadeh Boroujeni et al.

(10) Patent No.: US 12,160,386 B2
(45) Date of Patent: Dec. 3, 2024

(54) METHODS FOR RELIABLE COMMUNICATION USING PHYSICAL DOWNLINK CONTROL CHANNELS

(71) Applicant: INTERDIGITAL PATENT HOLDINGS, INC., Wilmington, DE (US)

(72) Inventors: Mahmoud Taherzadeh Boroujeni, San Diego, CA (US); Shahrokh Nayeb Nazar, San Diego, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/085,071

(22) Filed: Dec. 20, 2022

(65) Prior Publication Data
US 2023/0120035 A1 Apr. 20, 2023

Related U.S. Application Data

(63) Continuation of application No. 16/960,761, filed as application No. PCT/US2019/012855 on Jan. 9, 2019, now Pat. No. 11,533,146.
(Continued)

(51) Int. Cl.
*H04L 5/00* (2006.01)
*H04L 1/00* (2006.01)
(Continued)

(52) U.S. Cl.
CPC .......... *H04L 5/0053* (2013.01); *H04L 1/0038* (2013.01); *H04L 5/0094* (2013.01);
(Continued)

(58) Field of Classification Search
CPC .................. H04L 1/0038; H04W 72/23–232
See application file for complete search history.

(56) References Cited

U.S. PATENT DOCUMENTS 8,774,104 B2  7/2014  Zeira et al.
9,313,782 B2  4/2016  Chen et al.
(Continued)

FOREIGN PATENT DOCUMENTS

CN  102395206 A  3/2012
CN  103326841 A  9/2013
(Continued)

OTHER PUBLICATIONS

Huawei et al., "PDCCH reliability for URLLC," 3GPP TSG RAN WG1 NR Ad Hoc Meeting, R1-1709986, Qingdao, China (Jun. 27-30, 2017).
(Continued)

*Primary Examiner* — Kevin C. Harper
(74) *Attorney, Agent, or Firm* — Condo Roccia Koptiw LLP

(57) ABSTRACT

Methods for receiving and transmitting downlink transmissions with increased reliability are provided. A method includes receiving configuration information defining first and second search space sets. The first search space set includes a first one or more search spaces each including a plurality of physical downlink control (PDCCH) candidates. The second search space set includes a second one or more search spaces each including a plurality of PDCCH candidates. The configuration information indicates that the first and second one or more search spaces are linked. The method further includes receiving downlink control information (DCI) by detecting, based on the received configuration information, a first transmission using PDCCH candidates of the first one or more search spaces, detecting a second transmission using PDCCH candidates of the second one or more search spaces, and decoding at least one of the first transmission or the second transmission.

19 Claims, 10 Drawing Sheets

Related U.S. Application Data

(60) Provisional application No. 62/715,940, filed on Aug. 8, 2018, provisional application No. 62/615,825, filed on Jan. 10, 2018.

(51) Int. Cl.
*H04W 72/23* (2023.01)
*H04W 72/53* (2023.01)

(52) U.S. Cl.
CPC ............ *H04W 72/23* (2023.01); *H04L 1/0013* (2013.01); *H04L 1/0061* (2013.01); *H04W 72/53* (2023.01)

(56) References Cited

U.S. PATENT DOCUMENTS

| | | | |
|---|---|---|---|
| 9,473,965 | B2 | 10/2016 | Lee et al. |
| 9,794,913 | B2 | 10/2017 | Lee et al. |
| 9,867,186 | B2 | 1/2018 | Xu et al. |
| 9,918,335 | B2 | 3/2018 | Kim et al. |
| 10,165,582 | B2 | 12/2018 | Papasakellariou |
| 10,652,876 | B2 | 5/2020 | Seo et al. |
| 10,743,297 | B2 | 8/2020 | Nazar et al. |
| 11,218,271 | B2 | 1/2022 | Xiong et al. |
| 11,799,600 | B2 | 10/2023 | Boroujeni et al. |
| 2012/0282936 | A1 | 11/2012 | Gao et al. |
| 2013/0021994 | A1 | 1/2013 | Ji et al. |
| 2013/0039284 | A1 | 2/2013 | Marinier et al. |
| 2013/0039824 | A1 | 2/2013 | Abu-sharkh |
| 2013/0242882 | A1 | 9/2013 | Blankenship et al. |
| 2014/0286297 | A1 | 9/2014 | Zhao et al. |
| 2014/0328295 | A1 | 11/2014 | Ko et al. |
| 2015/0092646 | A1 | 4/2015 | Tabet et al. |
| 2016/0113008 | A1 | 4/2016 | Damnjanovic et al. |
| 2016/0242203 | A1 | 8/2016 | You et al. |
| 2017/0013626 | A1 | 1/2017 | Nan et al. |
| 2017/0332359 | A1 | 11/2017 | Tsai et al. |
| 2017/0353963 | A1 | 12/2017 | Hong et al. |
| 2017/0359807 | A1 | 12/2017 | Hong et al. |
| 2018/0198650 | A1 | 7/2018 | Nogami et al. |
| 2018/0227102 | A1 | 8/2018 | John Wilson et al. |
| 2018/0227156 | A1 | 8/2018 | Papasakellariou |
| 2018/0227887 | A1 | 8/2018 | Hakola et al. |
| 2018/0254853 | A1 | 9/2018 | Jung et al. |
| 2018/0279135 | A1 | 9/2018 | Hwang et al. |
| 2018/0279273 | A1 | 9/2018 | Yang et al. |
| 2018/0324816 | A1 | 11/2018 | Islam et al. |
| 2018/0368116 | A1 | 12/2018 | Liao et al. |
| 2019/0020506 | A1* | 1/2019 | Cheng ............ H04L 1/007 |
| 2019/0028234 | A1 | 1/2019 | Seo et al. |
| 2019/0037540 | A1 | 1/2019 | Seo et al. |
| 2019/0103941 | A1 | 4/2019 | Seo et al. |
| 2019/0132851 | A1 | 5/2019 | Davydov et al. |
| 2019/0158205 | A1 | 5/2019 | Sheng et al. |
| 2019/0173622 | A1 | 6/2019 | Xiong et al. |
| 2019/0253308 | A1 | 8/2019 | Huang et al. |
| 2019/0268208 | A1 | 8/2019 | Seo et al. |
| 2019/0297602 | A1 | 9/2019 | You et al. |
| 2019/0305867 | A1 | 10/2019 | Tseng et al. |
| 2019/0349960 | A1 | 11/2019 | Li et al. |
| 2020/0008231 | A1 | 1/2020 | Vilaipornsawai et al. |
| 2020/0028651 | A1 | 1/2020 | Xu |
| 2020/0029310 | A1* | 1/2020 | Lee ............ H04W 72/23 |
| 2020/0036497 | A1 | 1/2020 | Xu |
| 2020/0119895 | A1 | 4/2020 | Choi et al. |
| 2020/0145079 | A1 | 5/2020 | Marinier et al. |
| 2020/0154295 | A1 | 5/2020 | Lin |
| 2020/0252957 | A1 | 8/2020 | Cai et al. |
| 2020/0389847 | A1 | 12/2020 | Deng et al. |
| 2021/0112533 | A1 | 4/2021 | Tang |
| 2021/0227572 | A1 | 7/2021 | Miao et al. |
| 2022/0070909 | A1* | 3/2022 | Takeda ............ H04W 72/23 |
| 2023/0217278 | A1 | 7/2023 | Xu et al. |

FOREIGN PATENT DOCUMENTS

| | | |
|---|---|---|
| CN | 103650618 A | 3/2014 |
| CN | 103828282 A | 5/2014 |
| CN | 103916962 A | 7/2014 |
| CN | 104081709 A | 10/2014 |
| CN | 104823475 A | 8/2015 |
| CN | 105162565 A | 12/2015 |
| CN | 106888079 | 6/2017 |
| CN | 106888079 B | 3/2021 |
| GB | 2568486 A | 5/2019 |
| JP | 2016518091 A | 6/2016 |
| RU | 2521486 C2 | 6/2014 |
| TW | 201342860 A | 10/2013 |
| TW | 201709706 A | 3/2017 |
| WO | 2009/006016 | 1/2009 |
| WO | 2009006016 A2 | 1/2009 |
| WO | 2009/046061 | 4/2009 |
| WO | 2009046061 A2 | 4/2009 |
| WO | 2009/158050 | 12/2009 |
| WO | 2009158050 A2 | 12/2009 |
| WO | 2011066793 A1 | 6/2011 |
| WO | 2013141530 A1 | 9/2013 |
| WO | 2014121641 A1 | 8/2014 |
| WO | 2016/022849 | 2/2016 |
| WO | 2016022849 A1 | 2/2016 |
| WO | 2017160100 A2 | 9/2017 |
| WO | 2017171327 A2 | 10/2017 |
| WO | 2017173038 A1 | 10/2017 |
| WO | 2018204282 A1 | 11/2018 |

OTHER PUBLICATIONS

LG Electronics, "Discussion on DL control with ultra-reliability requirement," 3GPP TSG RAN WG1 Meeting 90bis, R1-1717955, Prague, CZ (Oct. 9-13, 2017).

CATT, "Remaining details of pre-emption indication," 3GPP TSG RAN WG1 Meeting #90bis, R1-1717838, Prague, Czechia (Oct. 9-13, 2017).

Fujitsu, "Discussion on reference signal in mini-slot," TSG-RAN WG1 #NR AH, R1-1700661, Spokane, USA (Jan. 16-20, 2007).

Guangdong Oppo Mobile Telecom, "On multiplexing eMBB and URLLC in DL," 3GPP TSG RAN WG1 meeting #88bis, R1-1704632, Spokane, Washington, USA (Apr. 3-7, 2017).

Huawei et al., "Remaining aspects on pre-emption indication for DL multiplexing of URLLC and eMBB," 3GPP TSG RAN WG1 Meeting #91, R1-1719402, Reno, USA (Nov. 27-Dec. 1, 2017).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium

(56) References Cited

OTHER PUBLICATIONS

Access Control (MAC) and Physical Layer (PHY) Specifications; Amendment 2: Sub 1 GHz License Exempt Operation, IEEE 802.11ah-2016 (Dec. 7, 2016).
Intel Corporation, "Multiplexing of different data channel durations," 3GPP TSG RAN WG1 Meeting NR#3, R1-1716325, Nagoya, Japan (Sep. 18-21, 2017).
Interdigital Inc., "On Initial Access for NR Unlicensed Spectrum," 3GPP TSG RAN WG1 Meeting #93, R1-1807037, Busan, South Korea (May 21-25, 2018).
Interdigital Inc., "On Paging for NR Unlicensed Spectrum," 3GPP TSG RAN WG1 Meeting #92bis, R1-1804888, Sanya, China (Apr. 16-20, 2018).
Interdigital Inc., "On Remaining Details of NR Paging Channel," 3GPP TSG RAN WG1 Meeting #93, R1-1807010, Busan, South Korea (May 21-25, 2018).
Interdigital Inc., "Remaining Details for Paging Channel," 3GPP TSG RAN WG1 Meeting #92bis, R1-1804841, Sanya, China (Apr. 16-20, 2018).
Interdigital Inc., "Remaining Details on Paging," 3GPP TSG RAN WG1 Meeting #92, R1-1802615, Athens, Greece (Feb. 26-Mar. 2, 2018).
Interdigital, Inc., "Considerations for ultra-reliable DCI transmission," 3GPP TSG RAN WG1 Meeting AH 1801, R1-1800600, Vancouver, Canada (Jan. 22-26, 2018).
Mediatek Inc., "Discussions on search space and CORESET designs," 3GPP TSG RAN WG1 Meeting #90bis, R1-1718323, Prague, Czechia (Oct. 9-13, 2017).
Mediatek Inc., "Remaining issues on pre-emption indication," 3GPP TSG RAN1 WG1 Meeting #91, R1-1719587, Reno, Nevada, USA (Nov. 27-Dec. 1, 2017).
Spreadtrum Communications, "Consideration on monitoring pre-emption indication in bandwidth parts," 3GPP TSG RAN WG1 Meeting AdHoc #3, R1-1715517, Nagoya, Japan (Sep. 18-21, 2017).
Third Generation Partnership Project, "Technical Specification Group Radio Access Network; Evolved Universal Terrestrial Radio Access (E-UTRA); Physical channels and modulation (Release 14)," 3GPP TS 36.211 V14.5.0 (Dec. 2017).
Third Generation Partnership Project, "Technical Specification Group Radio Access Network; Evolved Universal Terrestrial Radio Access (E-UTRA); Physical channels and modulation (Release 14)," 3GPP TS 36.211 V14.8.0 (Sep. 2018).
Third Generation Partnership Project, "Technical Specification Group Radio Access Network; Evolved Universal Terrestrial Radio Access (E-UTRA); Physical channels and modulation (Release 15)," 3GPP TS 36.211 V15.3.0 (Sep. 2018).
Third Generation Partnership Project, "Technical Specification Group Radio Access Network; Evolved Universal Terrestrial Radio Access (E-UTRA); Physical layer procedures (Release 14)," 3GPP TS 36.213 V14.4.0 (Sep. 2017).
Third Generation Partnership Project, "Technical Specification Group Radio Access Network; Evolved Universal Terrestrial Radio Access (E-UTRA); Physical layer procedures (Release 14)," 3GPP TS 36.213 V14.8.0 (Sep. 2018).
Third Generation Partnership Project, "Technical Specification Group Radio Access Network; Evolved Universal Terrestrial Radio Access (E-UTRA); Physical layer procedures (Release 15)," 3GPP TS 36.213 V15.3.0 (Sep. 2018).
Third Generation Partnership Project, "Technical Specification Group Radio Access Network; Evolved Universal Terrestrial Radio Access (E-UTRA); Physical layer procedures (Release 8)," 3GPP TS 36.213 V2.0.0 (Sep. 2007).
Third Generation Partnership Project, "Technical Specification Group Radio Access Network; Evolved Universal Terrestrial Radio Access (E-UTRA); Physical channels and modulation (Release 8)," 3GPP TS 36.211 V2.0.0 (Sep. 2007).
Third Generation Partnership Project, "Technical Specification Group Radio Access Network; NR; Physical layer procedures for control (Release 15)," 3GPP TS 38.213 V15.0.0 (Dec. 2017).
Third Generation Partnership Project, "Technical Specification Group Radio Access Network; NR; Physical layer procedures for control (Release 15)," 3GPP TS 38.213 V15.3.0 (Sep. 2018).
Third Generation Partnership Project, "Technical Specification Group Radio Access Network; NR; Radio Resource Control (RRC) protocol specification (Release 15)," 3GPP TS 38.331 V15.3.0 (Sep. 2018).
Third Generation Partnership Project, "Technical Specification Group Radio Access Network NR Radio Resource Control (RRC) protocol specification (Release 15)," 3GPP TS 38.331 V15.0.0 (Dec. 2017).
Wilus Inc., "Impact on eMBB DMRS puncturing by URLLC burst," 3GPP TSG RAN WG1 Meeting #89, R1-1708979, Hangzhou, P.R. China (May 15-19, 2017).
Wilus Inc., "Pre-emption indication on DL multiplexing between eMBB and URLLC," 3GPP TSG RAN WG1 Meeting #89, R1-1708980, Hangzhou, P.R. China (May 15-19, 2017).
IEEE, "IEEE Standard for Information technology—Telecommunications and Information Exchange between Systems—Local and Metropolitan Area Networks—Specific Requirements", Part 11: Wireless LAN Medium Access Control (MAC) and Physical Layer (PHY) Specifications, Amendment 4: Enhancements for Very High Throughput for Operation in Bands below 6GHZ, IEEE Std 802.11ac-2013, Dec. 11, 2013, 425 pages.
IEEE, "IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—A", IEEE Std 802.11 n-2009, Sep. 2009, pp. 1-536.
IEEE, "IEEE Standard for Information technology—Telecommunications and information exchange between systems Local and metropolitan area networks—Specific requirements", Part 11: Wireless LAN Medium Access Control (MAC) and Physical Layer (PHY) Specifications, IEEE Std. 802.11-2016, Dec. 7, 2016, pp. 1-3534.
IEEE Computer Society, "IEEE Standard for Information Technology—Telecommunications and Information Exchange between Systems Local and Metropolitan Area Networks—Specific Requirements", Part 11: Wireless LAN Medium Access Control (MAC) and Physical Layer (PHY) Specifications, Amendment 5: Television White Spaces (TVWS) Operation, IEEE 802.11af-2013, Dec. 11, 2013, 198 pages.
IEEE Computer Society, "IEEE Standard for Information technology—Telecommunications and Information Exchange between Systems Local and Metropolitan Area Networks Specific Requirements", Part 11: Wireless LAN Medium Access Control (MAC) and Physical Layer (PHY) Specifications; Amendment 2: Sub 1 GHz License Exempt Operation, IEEE P802.11ah-2016, Dec. 7, 2016, 594 pages.
3$^{rd}$ Generation Partnership Project (3GPP), R1-1700257, "NR DL Control Channel Structure", ZTE, ZTE Microelectronics, 3GPP TSG RAN WG1 NR Ad-Hoc Meeting, Spokane, USA, Jan. 16-20, 2017, pp. 1-6.
3$^{rd}$ Generation Partnership Project (3GPP), R1-1700346, "On Beam State Reporting", Intel Corporation, 3GPP TSG RAN WG1 NR Ad-Hoc Meeting, Spokane, USA, Jan. 16-20, 2017, pp. 1-6.
3$^{rd}$ Generation Partnership Project (3GPP), R1-1700661, "Discussion on Reference Signal in Mini-Slot", Fujitsu, TSG-RAN WG1 #NR AH Spokane, USA, Jan. 16-20, 2017, pp. 1-4.
3$^{rd}$ Generation Partnership Project (3GPP), R1-1704202, "Search Space Design Considerations", 3GPP TSG RAN WG1 Meeting #88bis; Huawei, HiSilicon; Spokane, USA, Apr. 3-7, 2017, 4 pages.
3$^{rd}$ Generation Partnership Project (3GPP), R1-1704618, "Search Space Design Consideration for NR PDCCH with BF", Guangdong OPPO Mobile Telecom, 3GPP TSG RAN WG1 Meeting #88bis, Spokane, Washington, Apr. 3-7, 2017, 8 pages.
3$^{rd}$ Generation Partnership Project (3GPP), R1-1704632, "On Multiplexing eMBB and URLLC in DL", Guangdong OPPO Mobile Telecom, 3GPP TSG RAN WG1 meeting #88bis, Spokane, Washington, USA, Apr. 3-7, 2017, 4 pages.
3$^{rd}$ Generation Partnership Project (3GPP), R1-1704950, "Search Space Design for NR-PDCCH", ETRI, 3GPP TSG RAN WG1 #88bis, Spokane, USA, Apr. 3-7, 2017, pp. 1-4.

(56) References Cited

OTHER PUBLICATIONS

3$^{rd}$ Generation Partnership Project (3GPP), R1-1705583, "Control Channel Multi-Beam Operation", 3GPP TSG-RAN WG1 #88bis; Qualcomm Incorporated; Spokane, USA, Apr. 3-7, 2017, 4 pages.
3$^{rd}$ Generation Partnership Project (3GPP), R1-1705718, "Views on beam management framework", 3GPP TSG RAN WG1 Meeting #88bis; NTT Docomo, Inc.; Spokane, USA, Apr. 3-7, 2017, 8 pages.
3$^{rd}$ Generation Partnership Project (3GPP), R1-1708333, "On Multi-TRP/Panel Transmission for DL", InterDigital Inc., 3GPP TSG RAN WG1 Meeting #89, Hangzhou, China, May 15-19, 2017, 4 pages.
3$^{rd}$ Generation Partnership Project (3GPP), R1-1708345, "Design Considerations for Beam-Based PDCCH", InterDigital Inc., 3GPP TSG RAN WG1 Meeting #89, Hangzhou, China, May 15-19, 2017, pp. 1-4.
3$^{rd}$ Generation Partnership Project (3GPP), R1-1708979, "Impact on eMBB DMRS puncturing by URLLC burst", Wilus Inc., 3GPP TSG RAN WG1 Meeting #89, Hangzhou, P.R. China, May 15-19, 2017, pp. 1-6.
3$^{rd}$ Generation Partnership Project (3GPP), R1-1708980, "Pre-Emption Indication on DL Multiplexing between eMBB and URLLC", WILUS Inc., 3GPP TSG RAN WG1 Meeting #89, Hangzhou, P.R. China, May 15-19, 2017, 3 pages.
3$^{rd}$ Generation Partnership Project (3GPP), R1-1709986, "PDCCH Reliability for URLCC", Huawei, HiSilicon, 3GPP TSG RAN WG1 NR Ad Hoc Meeting, Qingdao, China, Jun. 27-30, 2017, 7 pages.
3$^{rd}$ Generation Partnership Project (3GPP), R1-1710923, "DCI Design for Multi-TRP/Panel Transmission for DL", InterDigital Inc., 3GPP TSG RAN WG1 Meeting NRAH2, Qingdao, China, Jun. 27-30, 2017, 3 pages.
3$^{rd}$ Generation Partnership Project (3GPP), R1-1710944, "On the Impact of Multi-Beam Operation on PDCCH Structure", InterDigital Inc., 3GPP TSG RAN WG1 NR Ad-Hoc#2, Qingdao, China, Jun. 27-30, 2017, pp. 1-5.
3$^{rd}$ Generation Partnership Project (3GPP), R1-1712394, "Discussion on multi-beam operation for NR-PDCCH", 3GPP TSG RAN WG1 Meeting #90; Prague, Czechia; Agenda item: 6.1.3.1.2.3; Source: CATT, Aug. 21-25, 2017, 5 pages.
3$^{rd}$ Generation Partnership Project (3GPP), R1-1715517, "Consideration on Monitoring Preemption Indication in Bandwidth Parts", Spreadtrum Communications, 3GPP TSG RAN WG1 Meeting AdHoc #3, Nagoya, Japan, Sep. 18-21, 2017, 2 pages.
3$^{rd}$ Generation Partnership Project (3GPP), R1-1716325, "Multiplexing of Different Data Channel Durations", Intel Corporation, 3GPP TSG RAN WG1 Meeting NR#3, Nagoya, Japan, Sep. 18-21, 2017, 8 pages.
3$^{rd}$ Generation Partnership Project (3GPP), R1-1717838, "Remaining Details of Pre-Emption Indication", CATT, 3GPP TSG RAN WG1 Meeting #90bis, Prague, Czechia, Oct. 9-13, 2017, 7 pages.
3$^{rd}$ Generation Partnership Project (3GPP), R1-1717955, "Discussion on DL Control with Ultra-Reliability Requirement", LG Electronics, 3GPP TSG RAN WG1 Meeting 90bis Prague, CZ, Oct. 9-13, 2017, pp. 1-4.
3$^{rd}$ Generation Partnership Project (3GPP), R1-1718323, "Discussions on Search Space and CORESET Designs", MediaTek Inc., 3GPP TSG RAN WG1 Meeting #90bis, Prague, CZ, Oct. 9-13, 2017, 11 pages.
3$^{rd}$ Generation Partnership Project (3GPP), R1-1719402, "Remaining aspects on pre-emption indication for DL multiplexing of URLLC and eMBB", Huawei, HiSilicon, 3GPP TSG RAN WG1 Meeting #91, Reno, USA, Nov. 27-Dec. 1, 2017, 10 pages.
3$^{rd}$ Generation Partnership Project (3GPP), R1-1719587, "Remaining Issues on Pre-Emption Indication", MediaTek Inc., 3GPP TSG RAN1 WG1 Meeting #91, Reno, Nevada, USA, Nov. 27-Dec. 1, 2017, 6 pages.
3$^{rd}$ Generation Partnership Project (3GPP), R1-1721054, "NR PDCCH search space and number of BDs/CCEs per slot", 3rd Generation Partnership Project (3GPP); 3GPP TSG RAN WG1 Meeting #91; ZTE, Sanechips; Reno, USA, Nov. 27-Dec. 1, 2017, 5 pages.

3$^{rd}$ Generation Partnership Project (3GPP), R1-1800130, "Search space design and related issues", 3rd Generation Partnership Project (3GPP); 3GPP TSG RAN WG1 Meeting AH 1801; ZTE, Sanechips; Vancouver, Canada, Jan. 22-26, 2018, 9 pages.
3$^{rd}$ Generation Partnership Project (3GPP), R1-1800600, "Considerations for Ultra-Reliable DCI Transmission", InterDigital, Inc., 3GPP TSG RAN WG1 Meeting AH 1801, Vancouver, Canada, Jan. 22-26, 2018, 3 pages.
3$^{rd}$ Generation Partnership Project (3GPP), R1-1801338, "Summary of remaining issues on PDCCH monitoring with TP", 3rd Generation Partnership Project (3GPP); 3GPP TSG RAN WG1 Meeting #92; Huawei, HiSilicon; Athens, Greece, Feb. 26-Mar. 2, 2018, 4 pages.
3$^{rd}$ Generation Partnership Project (3GPP), R1-1802615, "Remaining Details on Paging", InterDigital Inc., 3GPP TSG RAN WG1 Meeting #92, Athens, Greece, Feb. 26-Mar. 2, 2018, 5 pages.
3$^{rd}$ Generation Partnership Project (3GPP), R1-1804841, "Remaining Details for Paging Channel", InterDigital Inc., 3GPP TSG RAN WG1 Meeting #92bis, Sanya, China, Apr. 16-20, 2018, 7 pages.
3$^{rd}$ Generation Partnership Project (3GPP), R1-1804888, "On Paging for NR Unlicensed Spectrum", InterDigital Inc., 3GPP TSG RAN WG1 Meeting #92bis, Sanya, China, Apr. 16-20, 2018, 3 pages.
3$^{rd}$ Generation Partnership Project (3GPP), R1-1807010, "On Remaining Details of NR Paging Channel", InterDigital Inc., 3GPP TSG RAN WG1 Meeting #93, Busan, South Korea, May 21-25, 2018, 3 pages.
3$^{rd}$ Generation Partnership Project (3GPP), R1-1807037, "On Initial Access for NR Unlicensed Spectrum", InterDigital Inc., 3GPP TSG RAN WG1 Meeting #93, Busan, South Korea, May 21-25, 2018, 6 pages.
3$^{rd}$ Generation Partnership Project (3GPP), TS 36.211 V10.0.0, "3rd Generation Partnership Project (3GPP)", Technical Specification Group Radio Access Network, Evolved Universal Terrestrial Radio Access (E-Utra), Physical Channels and Modulation (Release 10), Dec. 2010, pp. 1-103.
3$^{rd}$ Generation Partnership Project (3GPP), TS 36.211 V14.5.0, "3rd Generation Partnership Project (3GPP)", Technical Specification Group Radio Access Network, Evolved Universal Terrestrial Radio Access (E-Utra), Physical Channels and Modulation, (Release 14), Dec. 2017, pp. 1-197.
3$^{rd}$ Generation Partnership Project (3GPP), TS 36.211 V14.8.0, "3rd Generation Partnership Project (3GPP)", Technical Specification Group Radio Access Network, Evolved Universal Terrestrial Radio Access (E-Utra), Physical Channels and Modulation (Release 14), Sep. 2018, 199 pages.
3$^{rd}$ Generation Partnership Project (3GPP), TS 36.211 V15.3.0, "3rd Generation Partnership Project (3GPP)", Technical Specification Group Radio Access Network, Evolved Universal Terrestrial Radio Access (E-Utra), Physical Channels and Modulation, (Release 15), Sep. 2018, pp. 1-237.
3$^{rd}$ Generation Partnership Project (3GPP), TS 36.211 V2.0.0, "3rd Generation Partnership Project (3GPP)", Technical Specification Group Radio Access Network, Evolved Universal Terrestrial Radio Access (E-Utra), Physical Channels and Modulation (Release 8), Sep. 2007, pp. 1-49.
3$^{rd}$ Generation Partnership Project (3GPP), TS 36.213 V14.2.0, "3rd Generation Partnership Project (3GPP)", Technical Specification Group Radio Access Network, Evolved Universal Terrestrial Radio Access (E-Utra), Physical Layer Procedures (Release 14), Mar. 2017, pp. 1-454.
3$^{rd}$ Generation Partnership Project (3GPP), TS 36.213 V14.4.0, "3rd Generation Partnership Project (3GPP)", Technical Specification Group Radio Access Network, Evolved Universal Terrestrial Radio Access (E-Utra), Physical Layer Procedures (Release 14), Sep. 2017, pp. 1-462.
3$^{rd}$ Generation Partnership Project (3GPP), TS 36.213 V14.8.0, "3rd Generation Partnership Project (3GPP)", Technical Specification Group Radio Access Network, Evolved Universal Terrestrial Radio Access (E-Utra), Physical layer procedures (Release 14), Sep. 2018, 468 pages.
3$^{rd}$ Generation Partnership Project (3GPP), TS 36.213 V15.3.0, "3rd Generation Partnership Project (3GPP)", Technical Specification

(56) References Cited

OTHER PUBLICATIONS

Group Radio Access Network, Evolved Universal Terrestrial Radio Access (E-Utra), Physical Layer Procedures, (Release 15), Sep. 2018, pp. 1-546.

$3^{rd}$ Generation Partnership Project (3GPP), TS 36.213 V2.0.0, "3rd Generation Partnership Project (3GPP)", Technical Specification Group Radio Access Network, Evolved Universal Terrestrial Radio Access (E-Utra), Physical Layer Procedures (Release 8), Sep. 2007, pp. 1-13.

$3^{rd}$ Generation Partnership Project (3GPP), TS 38.213 V15.3.0, "3rd Generation Partnership Project (3GPP)", Technical Specification Group Radio Access Network, NR, Physical Layer Procedures for Control (Release 15), Sep. 2018, pp. 1-101.

$3^{rd}$ Generation Partnership Project (3GPP), TS 38.331 V15.0.0, "3rd Generation Partnership Project (3GPP)", Technical Specification Group Radio Access Network NR Radio Resource Control (RRC) Protocol Specification (Release 15), Dec. 2017, pp. 1-188.

$3^{rd}$ Generation Partnership Project (3GPP), TS 38.331 V15.3.0, "3rd Generation Partnership Project (3GPP)", Technical Specification Group Radio Access Network, NR, Radio Resource Control (RRC) protocol specification, (Release 15), Sep. 2018, pp. 1-445.

\* cited by examiner

METHODS FOR RELIABLE COMMUNICATION USING PHYSICAL DOWNLINK CONTROL CHANNELS

CROSS REFERENCE TO RELATED APPLICATIONS

This application is a continuation of U.S. patent application Ser. No. 16/960,761 filed on Jul. 8, 2020, which issued as U.S. Pat. No. 11,533,146 on Dec. 20, 2022, which is the U.S. National Stage, under 35 U.S.C. § 371, of International Application No. PCT/US2019/012855 filed Jan. 9, 2019, which claims the benefit of U.S. Provisional Application No. 62/615,825, filed Jan. 10, 2018, and U.S. Provisional Application No. 62/715,940, filed Aug. 8, 2018, the contents of which are hereby incorporated by reference herein.

BACKGROUND

In New Radio (NR) for Fifth Generation (5G) wireless systems, the structure and design for the physical downlink control channel (PDCCH) uses two transmission modes of interleaving units and non-interleaving units known as Resource Element Group (REG) bundles. Each REG bundle consists of multiple REGs in time or frequency for joint channel estimation. Slot-based and non-slot-based transmissions and different rates of monitoring for PDCCH are also defined in NR for 5G wireless systems.

SUMMARY

Methods for receiving and transmitting downlink transmissions with increased reliability are provided. A method includes receiving configuration information defining first and second search space sets. The first search space set includes a first one or more search spaces each including a plurality of physical downlink control (PDCCH) candidates. The second search space set includes a second one or more search spaces each including a plurality of PDCCH candidates. The configuration information indicates that the first and second one or more search spaces are linked. The method further includes receiving downlink control information (DCI) by detecting, based on the received configuration information, a first transmission using PDCCH candidates of the first one or more search spaces, detecting a second transmission using PDCCH candidates of the second one or more search spaces, and decoding at least one of the first transmission or the second transmission.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
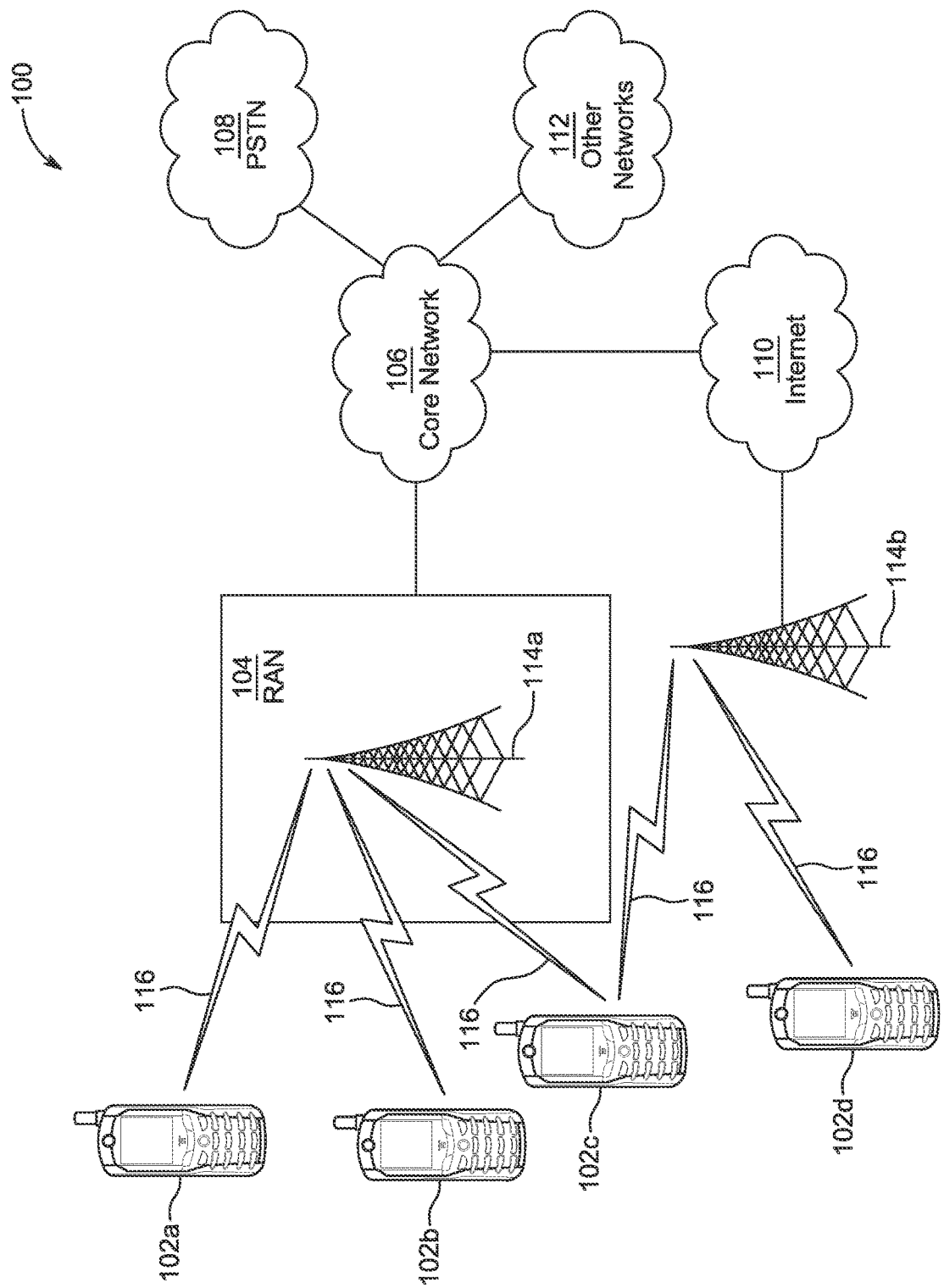
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT)

device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a g NB).

In other embodiments, the base station 114a and the WTRUs 102a, 102b, 102c may implement radio technologies such as IEEE 802.11 (i.e., Wireless Fidelity (WiFi)), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
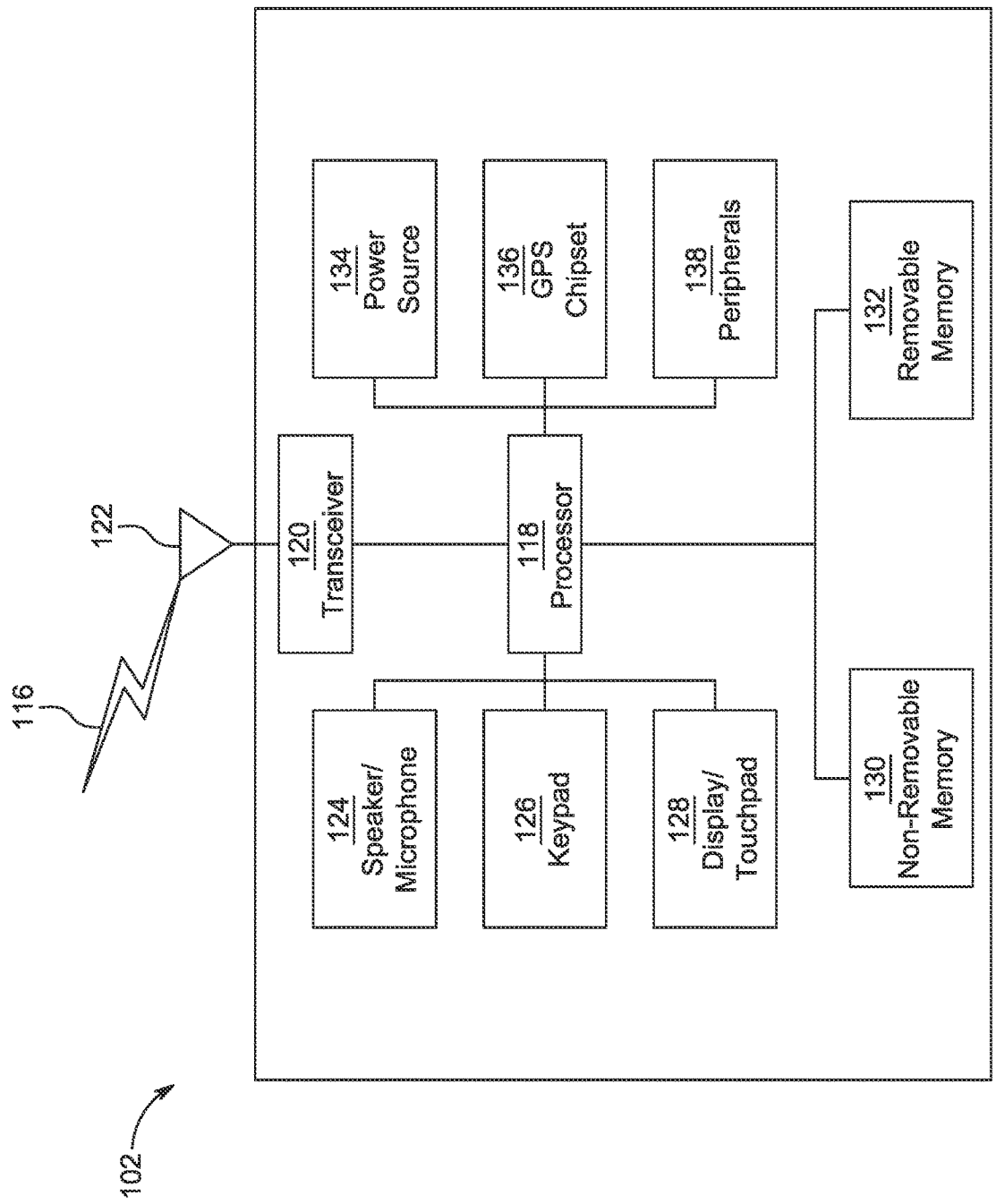
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
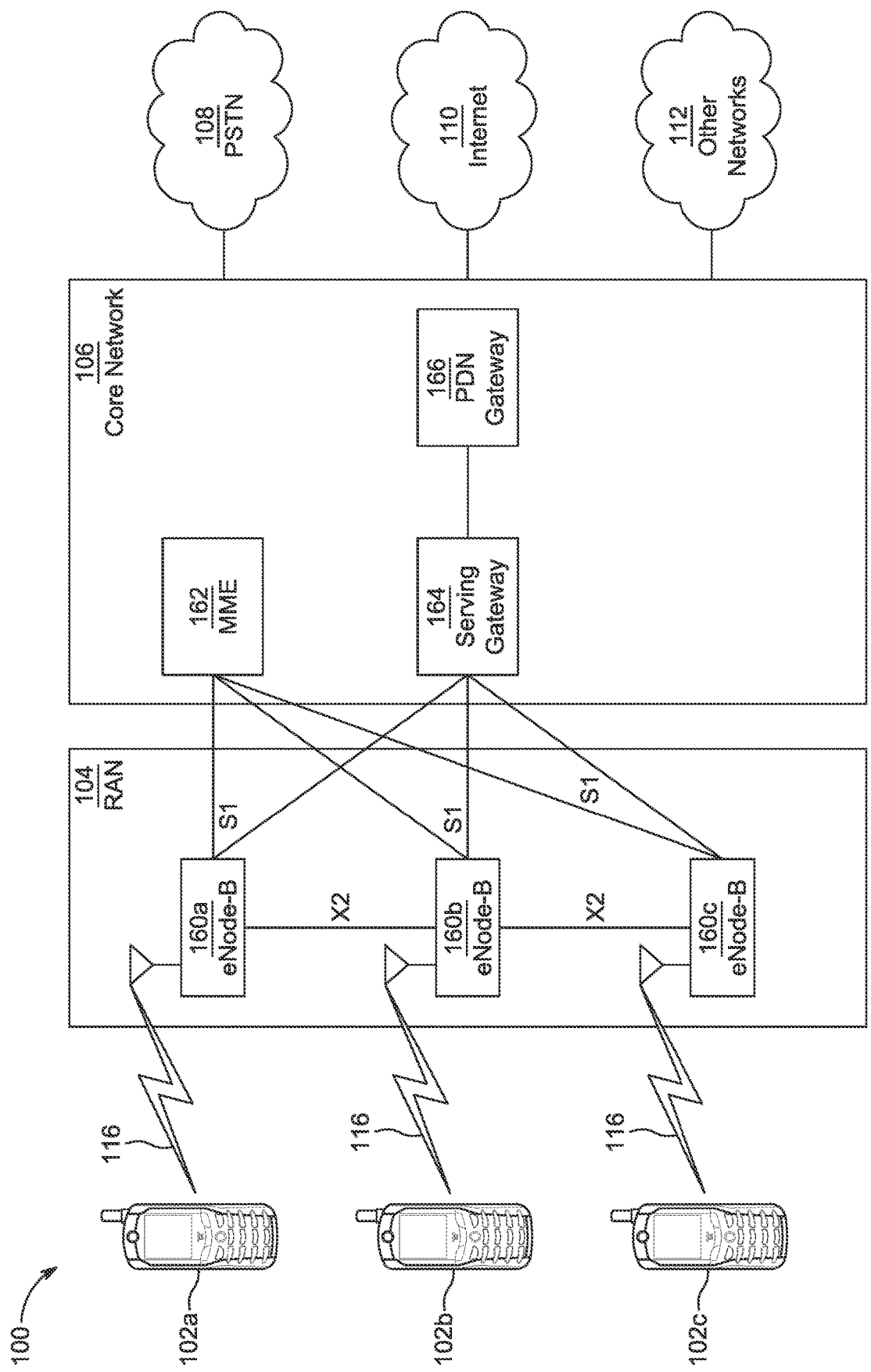
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
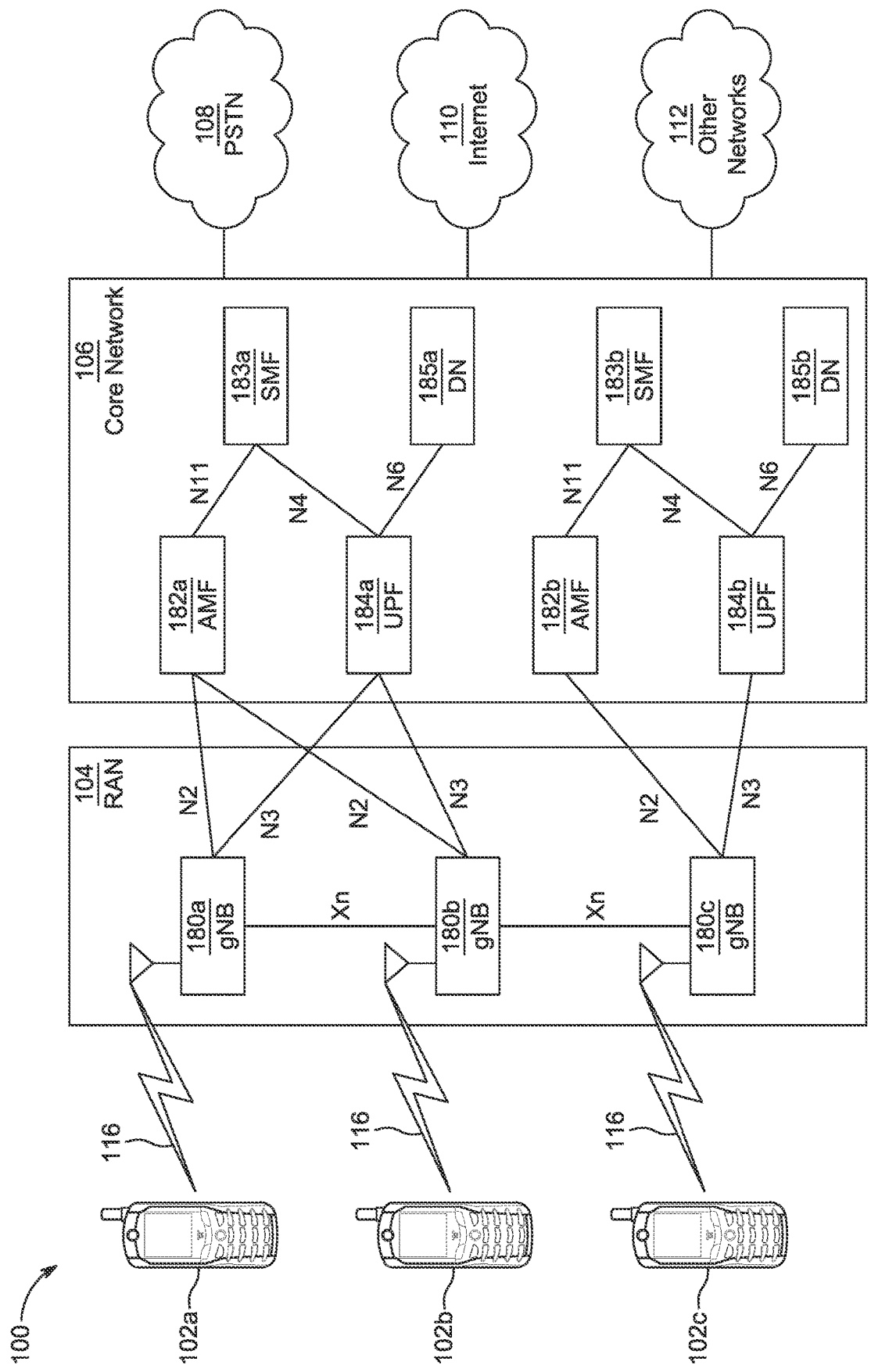
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency communication (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

WTRU, UE, and user may be used interchangeably herein.

In NR for 5G wireless systems, ultra-reliable low latency communication (URLLC) systems have a need for mechanisms that increase the reliability of the control channel (e.g., the PDCCH), for example by lowering the block error rate (BER) and lowering the probability of blocking.

As used herein, a reference symbol may include a symbol (e.g., which may be expressed as a complex number) that is fixed and known and used as a pilot symbol. A reference signal may include the time domain signal that is generated by processing reference symbols. For example, in OFDM, reference symbols may be complex numbers fed into n Inverse Discrete Fourier Transform (IDFT) block and the reference signal may be the output of the IDFT block. The downlink control information (DCI) may include a set of bits that are transmitted over a PDCCH carrying control information for a WTRU (user) or a group of WTRUs (users).

A resource element (RE) may include one OFDM symbol on one subcarrier. A resource element group (REG) may include a group of REs used as building blocks of a control channel element (CCE) that assigns resource elements to a WTRU. REG Bundles are REGs that are adjacent in time or frequency and that are grouped together with the same associated precoders. NR-REG, NR-CCE and NR-PDCCH may be used to refer to a REG, a CCE, and a PDCCH for NR in 5G wireless systems.

In 5G NR, a REG may be the smallest building block for the PDCCH. For example, each REG may consist of 12 REs on one OFDM symbol in time and one resource block (RB) in frequency. In each REG, 9 REs may be used for control information and 3 REs may be used for demodulation reference signals (DMRSs). Multiple REGs (e.g., 2, 3, or 6), adjacent in time or frequency, may form a REG bundle used with the same precoder and having DMRSs that are used together for channel estimation. 6 REGs (e.g., in the format of 1, 2, or 3 REG bundles) may form one CCE for PDCCH. Each PDCCH may consist of one or multiple CCEs (e.g., 1, 2, 4, 8, or 16 CCEs) and the number of CCEs for a PDCCH may be referred to as the aggregation level (AL) of the PDCCH.

Mapping of REG bundles may include the following modes: interleaving mode and non-interleaving mode. In the non-interleaving mapping, consecutive REG bundles (i.e., adjacent in frequency) form a CCE and CCEs adjacent in frequency form a PDCCH. In the interleaving mapping, REGs are interleaved (or permuted) before being mapped to CCEs, which may result in some (or all) non-adjacent REG bundles in one CCE and some (or all) non-adjacent CCEs in one PDCCH.

A Control Resource Set (CORESET) may be configured by its frequency assignment (e.g., in chunks of 6 RBs), the length in time (1-3 OFDM symbols), the type of REG bundle, and the type of mapping from REG bundles to CCEs (i.e., interleaving or non-interleaving). In an example, in each bandwidth part (BWP), there may be up to 3 CORE-SETs (12 CORESETs in all 4 possible bandwidth parts).

A WTRU may be assigned with a set of PDCCH candidates to monitor during the blind detection of PDCCH, which is referred to as the search space or the set of search spaces (e.g., for multiple ALs). Each set of search spaces may be configured by its associated CORESET, the number of candidates with each AL, and the monitoring occasions. The monitoring occasions may be determined by the monitoring periodicity (e.g., in terms of slots), monitoring offset, and monitoring pattern (14 bits corresponding to all possible patterns of symbols inside a slot).

Example methods for providing sufficient resources for transmission of the downlink control channel for URLLC WTRUs may include the preemption of an eMBB control channel(s) in the presence of a URLLC channel(s). In an example, resources may be assigned for downlink control channel transmission may be used for eMBB WTRUs. The downlink control channel for URLLC WTRUs may receive higher priority than the downlink control channel for eMBB WTRUs. For example, the presence of the PDCCH for URLLC WTRUs may preempt or partially preempt the transmission of the scheduled PDCCH for eMBB WTRUs.

To lower the probability of locking the PDCCH of URLLC WTRUs, URLLC WTRUs may be given higher priority over the PDCCH of eMBB WTRUs. In an example, in scheduling of PDCCH of different WTRUs based on their search spaces, a gNB may first schedule the PDCCH for URLLC WTRUs. The gNB may then schedule the PDCCH for eMBB WTRUs by removing the PDCCH candidates that are already fully or partially used for URLLC WTRUs from the search spaces corresponding to the active eMBB WTRUs. Enabling eMBB PDCCH preemption may reduce or eliminate blocking and increase reliability of PDCCH for URLLC WTRUs by allowing usage of more resources.

Figure 2:
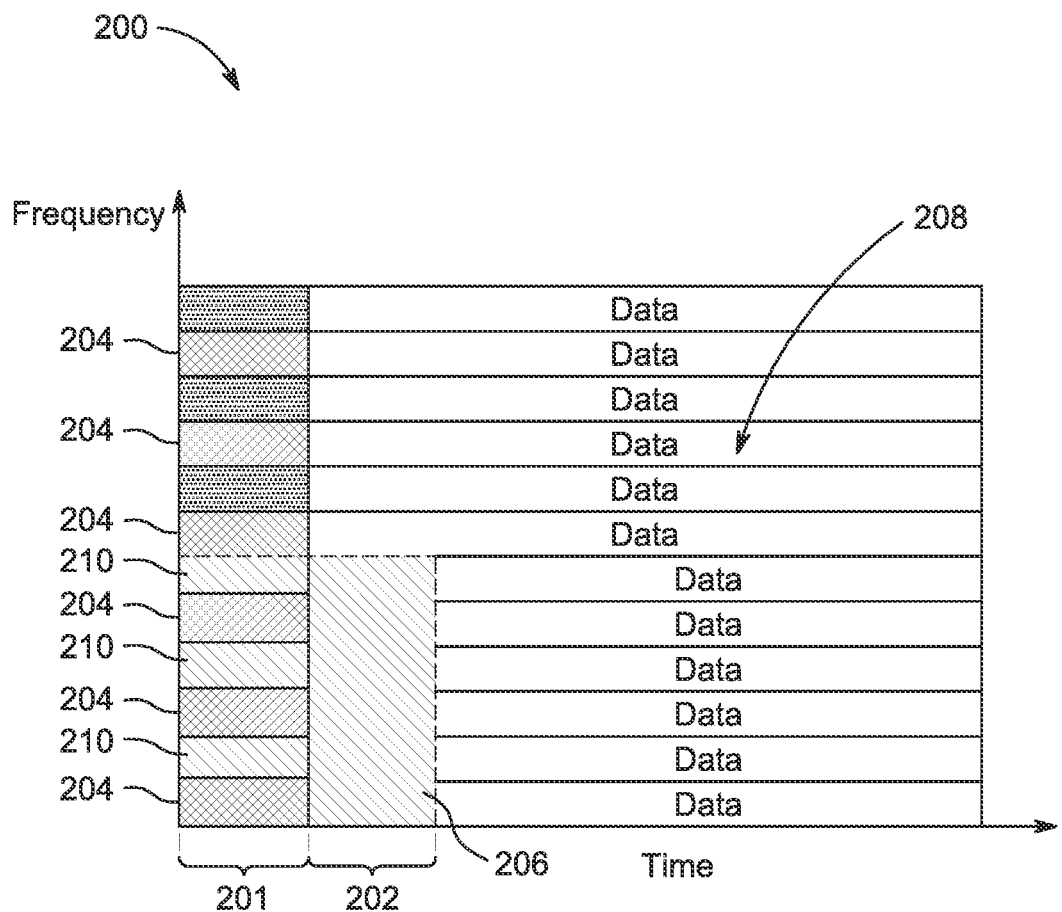
FIG. 2 is a scheduling diagram of an example scheduling method for partially preempting the physical downlink control channel (PDCCH) for enhanced massive mobile broadband (eMBB) WTRUs in the presence of PDCCH for ultra-reliable low latency communication (URLLC) WTRUs.

Example methods may be used for partially preempting the PDCCH for eMBB WTRUs in the presence of PDCCH for URLLC WTRUs. Two different overlapping CORESETs may be assigned for the PDCCH of eMBB WTRUs and the PDCCH of URLLC WTRUs, respectively. The different overlapping CORESETs may have different REG bundling types and/or transmission modes (i.e. interleaving vs. non-interleaving). To reduce delay for URLLC WTRUs, the CORESET assigned for the PDCCH of the URLLC WTRUs may be allocated on the first OFDM symbol of the slot and the CORESET assigned for the PDCCH of the eMBB WTRUs may be multi-symbol. When a PDCCH candidate in the URLLC CORESET is scheduled, transmission of eMBB PDCCH may be preempted on the REGs that are shared with the transmitted URLLC PDCCH. When preemption takes place on the shared REGs, rate matching may be employed to match the code rate of the eMBB PDCCH based on the remaining available REGs of the PDCCH. FIG. 2 is a scheduling diagram of an example scheduling method 200 for partially preempting the PDCCH for eMBB WTRUs in the presence of PDCCH for URLLC WTRUs. A PDCCH 204 is scheduled for the URLLC WTRUs on the first OFDM symbol 201 and partially preempts transmission of the PDCCH 210 on the two-symbol CORESET 206 (across symbols 201 and 202) for the eMBB WTRUs. Data 208 may be transmitted following the transmission of the PDCCHs 204 and 210.

At the receiver, an eMBB WTRU may detect the preempted REGs of a PDCCH candidate by comparing the channel estimates from the DMRS of one REG bundle. For example, in the case that REG bundling is done in time for the eMBB CORESET and the URLLC CORESET covers only the first symbol of the slot, if the eMBB WTRU observes a large discrepancy between the channel estimate for the REG on the first symbol and the channel estimate for other REGs of that REG bundle, the eMBB WTRU may assume that the REG on the first symbol is used by a URLLC WTRU and may identify it as a preempted REG. The eMBB WTRU may remove the preempted REGs from the set of REGs that are used for channel estimation (and PDCCH detection) and may complete the channel estimation procedure by joint channel estimation of the remaining REGs for each REG bundle. The eMBB WTRU may perform blind decoding on the remaining REGs based on the channel estimation and the received signal and apply the rate matching associated with the number of remaining REGs.

Based on the number of remaining REGs in each REG bundle, the quality of the channel estimation and, therefore, the quality of soft decisions for the received coded bits based on those REGs, may be different. Therefore, the eMBB WTRU may use the information about the removed REGs from each bundle (and related information such as the number of DMRS used for channel estimation for an REG bundle) for the decoding process. For example, the number of DMRS used for channel estimation may affect the quality of channel estimation and this may be taken to account when calculating log-likelihood ratio (LLR) of the received coded bits in the decoding process (i.e. the quality of soft decisions in the decoding process).

After decoding, similar to the regular blind detection of the PDCCH, the eMBB WTRU may check a cyclic redundancy code (CRC) to determine if the decoded data is correct and whether it is associated with the eMBB's radio network temporary identifier (RNTI). An indication of a need for the blind detection procedure (i.e., the existence of possible overlapping URLLC PDCCH on a part of the eMBB CORESET) and/or extra parameters that may be useful in the blind detection procedure may or may not be included in the eMBB CORESET configuration provided by the gNB radio resource control (RRC) layer. The extra parameters may include information such as the overlapped resource region (e.g., expressed in terms of the OFDM symbol index and the RBs, for example with granularity of 6 RBs, which is used for frequency configuration of CORESETs in 5G NR) and/or the transmission mode of the overlapping URLLC CORESET. If the indication of a need for the blind detection procedure is not included in the CORESET configuration received from the gNB, the WTRU may implicitly derive the overlapping parts of the CORESETs based on some pre-defined patterns. For example, assuming the eMBB WTRU is configured with a relatively wideband CORESET on the first OFDM symbol (e.g., a single-symbol CORESET as wide as the bandwidth part), and a narrow-band multi-symbol CORESET (e.g., a multi-symbol CORESET much smaller than the bandwidth part) which overlaps with the single-symbol CORESET, the eMBB WTRU may assume that the REGs on the first OFDM symbol are preempted according to an a priori known pattern. This method may be useful when the URLLC CORESET is single-symbol and the eMBB CORESET is multi-symbol, and may be applied when both CORESETs cover the same symbol(s), but with different modes of transmission (e.g., one interleaved and one non-interleaved).

Figure 3:
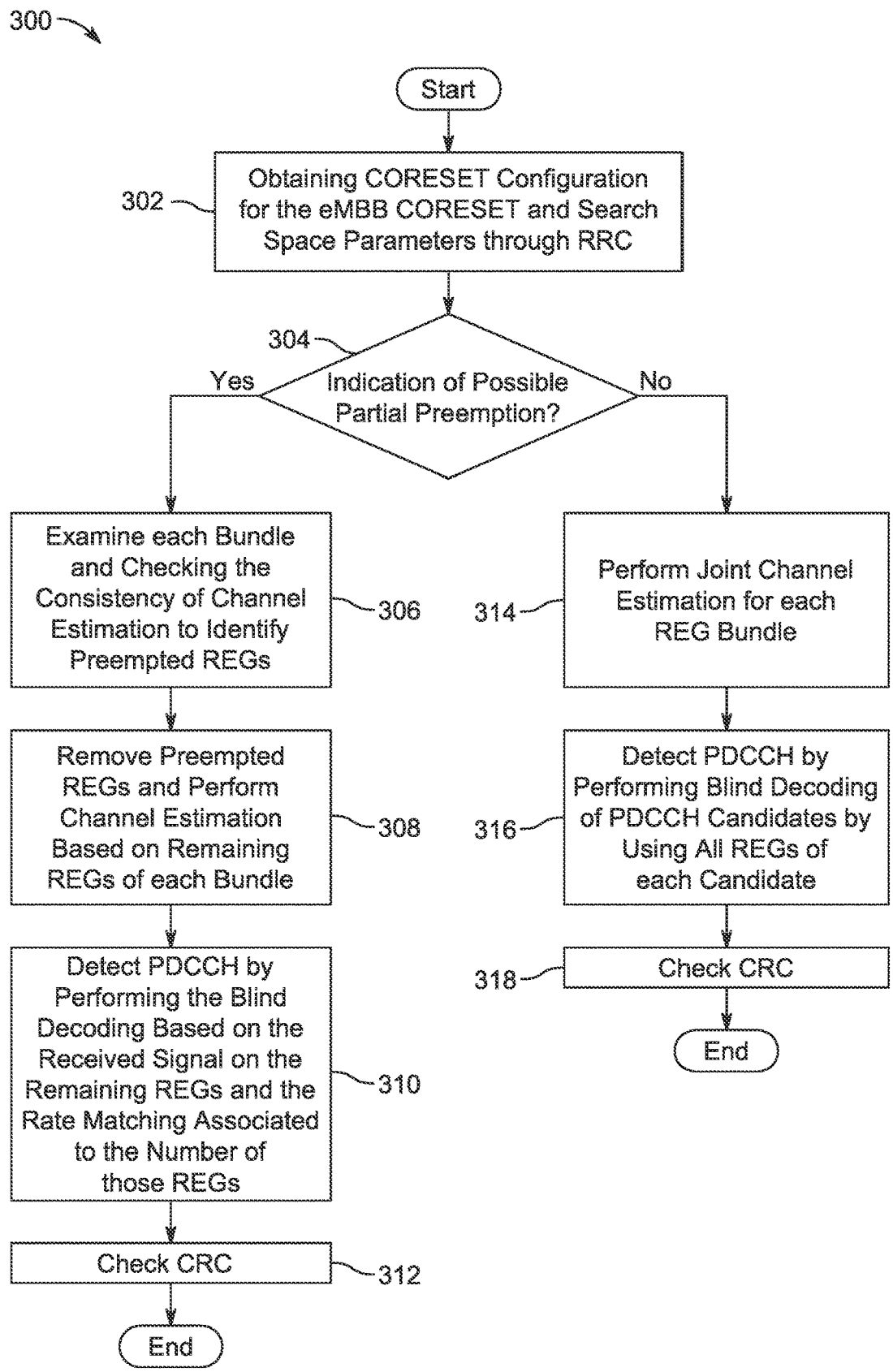
FIG. 3 is a flow diagram of an example method for partial preemption of PDCCH for eMBB in the presence of PDCCH for URLLC.

FIG. 3 is a flow diagram of an example method 300 for partial preemption of PDCCH for eMBB in the presence of PDCCH for URLLC. The example method 300 may be performed by the WTRU of the eMBB user. For example, the example method 300 may be performed when the URLLC CORESET is single-symbol and the eMBB CORESET is multi-symbol. At 302, the eMBB WTRU may obtain a CORESET configuration for the eMBB CORESET and search space parameters (e.g., through RRC signaling). The CORESET configuration may include a preemption indication parameter (a PDCCH preemption indicator). At 304, the eMBB WTRU may determine if the eMBB CORESET configuration includes an indication of possible (partial) preemption (i.e., an indication that PDCCH preemption is enabled). If a preemption indicator is not used, the eMBB WTRU may implicitly derive the overlapping parts of the CORESETs to determine the possibility of preemption as described above. If the indication of possible preemption is detected, then at 306, the eMBB WTRU may examine each REG bundle and check the consistency of channel estimation to identify preempted REGs. At 308, the eMBB WTRU may remove the preempted REGs from the set of REGs that are used for channel estimation of the REG bundle (and PDCCH detection) and perform channel estimation based on (e.g., the DMRS of) the remaining REGs of each REG bundle. At 310, the eMBB WTRU may detect the PDCCH by perform blind decoding, based on the received signal, on the remaining REGs of each REG bundle (and avoiding the preempted REGs) and perform rate matching associated to the number of remaining REGs in each REG bundle. At 312, the eMBB WTRU may check CRC of the data decoded from the remaining REGs to detect errors and may receive the PDCCH (e.g., determine if the PDCCH is for the eMBB WTRU by checking the RNTI, etc.). If an indication of possible partial preemption is not detected, then at 314, the eMBB WTRU may perform joint channel estimation for each REG bundle. At 316, the eMBB may perform blind decoding of the PDCCH candidates using all REGs of each PDCCH candidate. At 318, the eMBB WTRU may check CRC of the data decoded from all REGs to detect errors and may receive the PDCCH (e.g., determine if the PDCCH is for the eMBB WTRU by checking the RNTI, etc.)

Example methods may be used for full preemption of the PDCCH for eMBB WTRUs when overlapped with the PDCCH for URLLC WTRUs. In an example, the draft scheduling of PDCCH for eMBB WTRUs may be done independently of the scheduling of PDCCH for URLLC WTRUs. The transmission of a scheduled PDCCH for an eMBB WTRU may be preempted when the eMBB PDCCH candidate is needed for the PDCCH of a URLLC WTRU or when the eMBB PDCCH candidate overlaps with the PDCCH scheduled for URLLC. This method of fully preempting the PDCCH of eMBB users may result in a large probability of blocking for eMBB WTRUs. In order to avoid large probabilities of blocking, a small number of additional spare PDCCH candidates on the same CORESET or on another CORESET may be assigned to be monitored by eMBB WTRUs when an eMBB WTRU cannot find and decode its intended PDCCH in its default search space.

Figure 4:
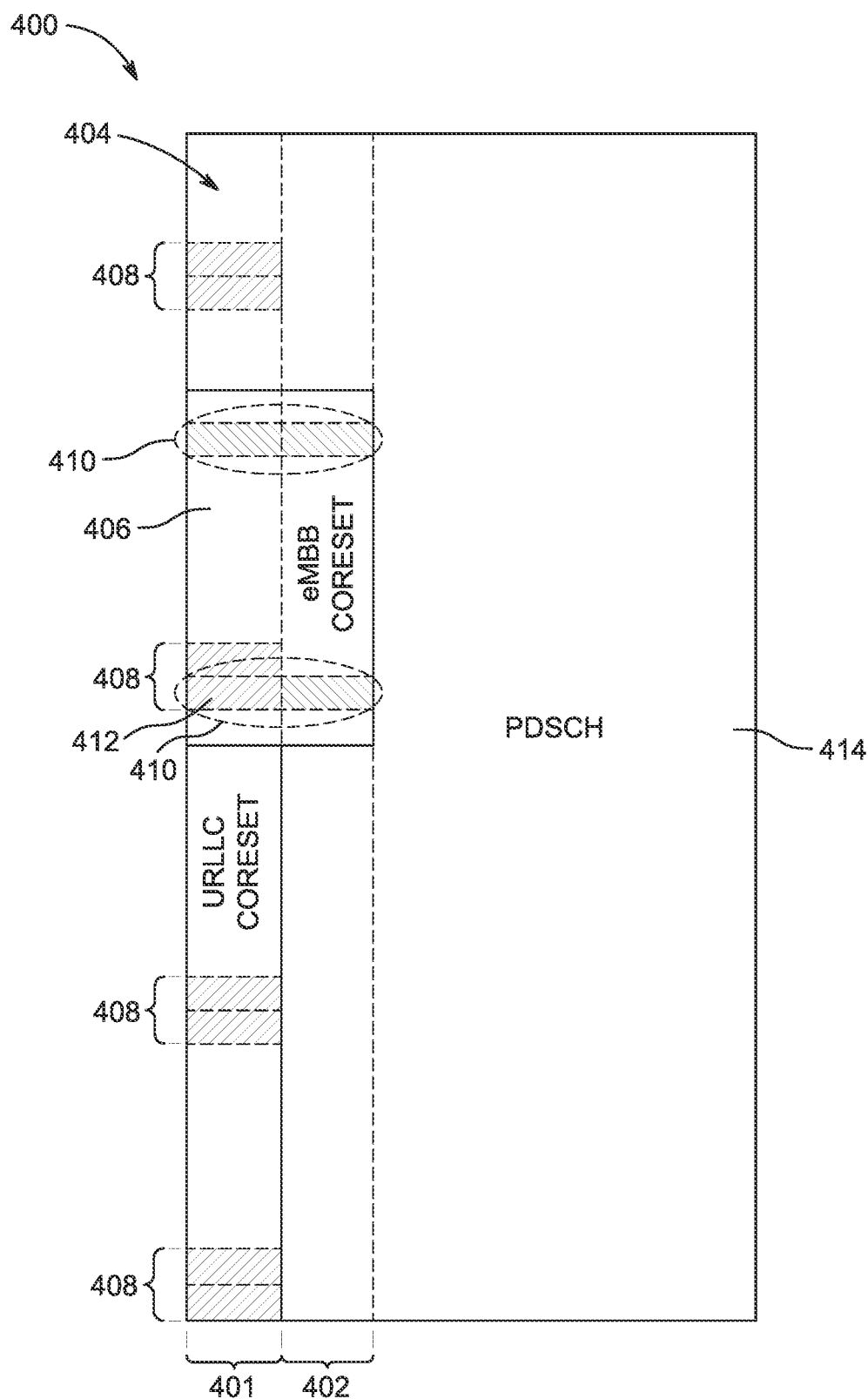
FIG. 4 is another scheduling diagram of an example scheduling method for partially preempting the PDCCH for eMBB WTRUs in the presence of PDCCH for URLLC WTRUs.

FIG. 4 is another scheduling diagram of an example scheduling method 400 for partially preempting the PDCCH for eMBB WTRUs in the presence of PDCCH for URLLC WTRUs. The URLLC CORESET 404 (for URLLC WTRUs to search for PDCCH) occupies OFDM symbol 401 (spanning all frequencies) and the eMBB CORESET 406 (for eMBB WTRUs to search for PDCCH) occupies a subset of frequencies across OFDM symbols 401 and 402, thereby partially overlapping with the URLLC CORESET 504 on certain carrier frequencies of OFDM symbol 401. According to the example of FIG. 4, multiple REG bundles 408 for URLLC PDCCH are scheduled in OFDM symbol 401, and multiple REG bundles 410 are scheduled in OFDM symbols 401 and 402, such that eMBB PDCCH is preempted on REG 412 by the URLLC PDCCH because of the CORESET overlap. Data may be transmitted (e.g., physical downlink shared channel (PDSCH) 414) following the transmission of the PDCCHs on OFDM symbols 401 and 402.

Figure 5:
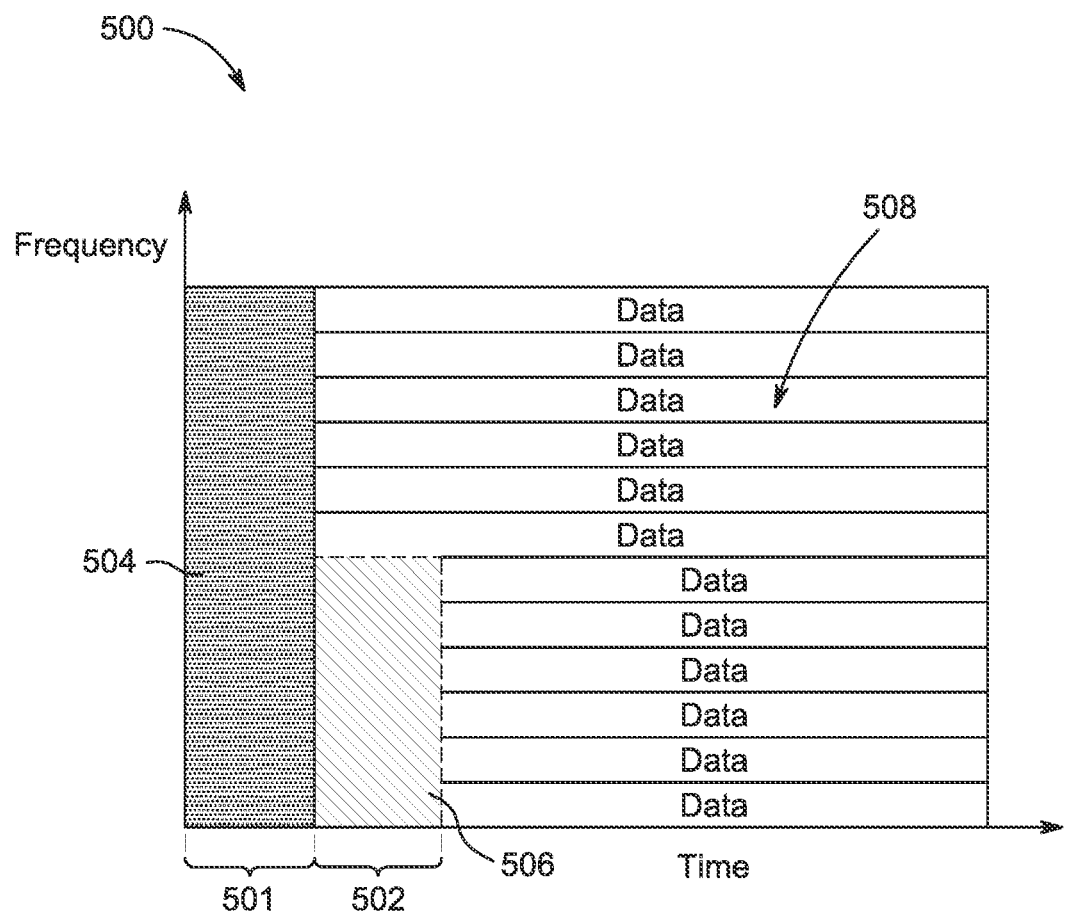
FIG. 5 is a scheduling diagram of an example scheduling method for fully preempting the PDCCH for eMBB WTRUs when overlapped with the PDCCH for URLLC WTRUs.

FIG. 5 is a scheduling diagram of an example scheduling method 500 for fully preempting the PDCCH for eMBB WTRUs when overlapped with the PDCCH for URLLC WTRUs. As shown in FIG. 5, a large or main CORESET 504 for both eMBB and URLLC WTRUs may be configured on the first OFDM symbol 501 of the slot (e.g., symbol 0, if they are numbered from zero), and a smaller (spare) CORESET 506 may be configured on the second (and/or third) OFDM symbol 502 of the slot containing a small number of PDCCH candidates for the eMBB WTRUs in the case that their intended PDCCH is preempted on the main CORESET 504. The structure of the smaller CORESET 506, which contains the spare PDCCH candidates and the number and the size (aggregation level) of those spare PDCCH candidates, may be configured by the RRC for example. The location of the spare PDCCH candidates with different aggregation levels inside the spare CORESET 506 may be fixed or obtained through the hashing function that is defined for search spaces. All active eMBB WTRUs may have the same search space inside the spare CORESET 506, or their corresponding search spaces may be different. Data 508 may be transmitted following the transmission of the PDCCHs in CORESETs 504 and/or 506.

The methods for preempting the PDCCH of eMBB WTRUs described herein may not affect the behavior of URLLC WTRUs, and may affect the behavior for eMBB WTRUs. For example, an eMBB WTRU may be explicitly or implicitly configured by a gNB (e.g., using RRC signaling) to only blind decode its PDCCH candidates in the spare CORESET or in the spare search space if the blind decoding of its PDCCH candidates in the main CORESET or in its main set of search spaces is unsuccessful. The implicit configuration for the eMBB WTRU behavior for the spare CORESET may be done during CORESET configuration by including an indication of the spare status of the spare CORESET and/or the index of the main CORESET associated with the spare CORESET.

Methods may be used for transmission of URLLC DCI on multiple PDCCHs by the gNB, and corresponding methods for a receiving URLLC WTRU, to increase the reliability of DCI transmission for URLLC WTRUs. In an example, the reliability of DCI transmission for URLLC may be increased by adding redundancy in PDCCH for a URLLC user. For example, the same DCI may be transmitted over two or more PDCCHs for a URLLC WTRU, or joint redundancy for multiple DCIs intended for a URLLC WTRU may be transmitted by the gNB.

In an example for enhancing the reliability of an URLLC control channel, the transmission of the same DCI content may be repeated on multiple PDCCHs. The PDCCH transmission may be repeated with the same rate and/or the same transmission mode (e.g., by repeating the same PDCCH on two different locations) or may be repeated using different rates (e.g., using PDCCHs with different aggregation levels) and/or different transmission modes (e.g., using interleaved versus non-interleaved mode).

In an example, the same DCI may be transmitted over two or more PDCCH candidates of a same search space. In this example, two or more PDCCH candidates (with the same or different aggregation levels) may be used at the same time by the gNB to transmit one DCI to a WTRU (e.g., a URLLC WTRU). The number of or the maximum number of simultaneous PDCCHs scheduled for the WTRU may be indicated in the configuration of the search space of the WTRU (e.g., using RRC signaling), and/or may be indicated in the CORESET configuration for all associated WTRUs.

In another example, the same DCI may be transmitted over two or more PDCCH candidates of different search spaces on a same CORESET. In this example, two or more sets of search spaces (e.g., each set of search spaces may contain several candidates with different aggregation levels) may be assigned to a WTRU. The WTRU may expect and monitor for a scheduled PDCCH on each of assigned sets of search spaces. The RRC configuration may indicate whether the aggregation levels of the multiple PDCCHs, that are carrying the same DCI, are the same or different.

Figure 6:
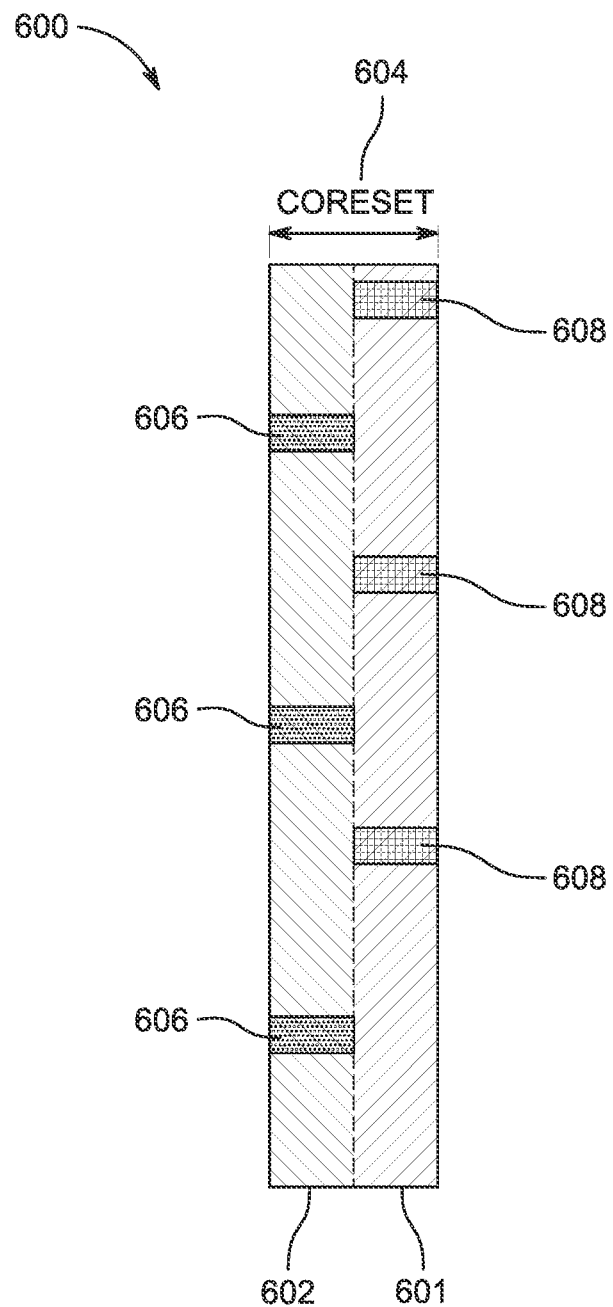
FIG. 6 is a scheduling diagram of an example method for transmission of the same downlink control information (DCI) over two PDCCH candidates of two different sets of search spaces on a same control resource set (CORESET)

In the case that the aggregation levels of the multiple PDCCHs are the same, there may be a one-to-one correspondence between the candidates of the sets of search spaces, as shown in FIG. 6. FIG. 6 is a scheduling diagram of an example method 600 for transmission of the same DCI over two PDCCH candidates, REG bundles 606 and REG bundles 608, of two different sets of search spaces 601 and 602, respectively on a same CORESET 604. In this case, the scheduling of the corresponding candidates, REG bundles 606 and REG bundles 608, in the different sets of search spaces 601 and 602, respectively, may be linked to each other (i.e. corresponding candidates may be scheduled simultaneously) and this correspondence may be explicitly or implicitly indicated in the RRC configuration of the CORESET 604 and/or the sets of search spaces 601 and 602. This correspondence may help the WTRU simplify the blind detection of the PDCCH received on the REG bundles 606 and 608. In the example of FIG. 6, each of the two or more sets of search spaces 601 and 602 are on a single OFDM symbol respectively inside a multi-symbol CORESET 604, and may be associated with different beams.

In the example above, the one-to-one correspondence between the PDCCH candidates of two or more different sets of search spaces may be implemented using the same RNTI and the same set of aggregation levels and numbers of candidates for each aggregation level as the parameters for the hashing functions of the two or more sets of search spaces. When the sets of aggregation levels and the numbers of candidates of each aggregation level for the two or more sets of search spaces is the same, the one-to-one correspondence may be based on the index of candidates for each aggregation level. In addition, the rule for one-to-one correspondence may be pre-specified or configured by the gNB (e.g., using RRC signaling). This one-to-one correspondence between the PDCCH candidates of two or more different sets of search spaces may be inside one CORESET or between two or more different sets of search spaces from different CORESETs and/or different monitoring occasions.

At the receiver, the WTRU may perform a blind search for all the sets of search spaces intended for the DCI independently by checking the RNTI through CRC checking for each PDCCH candidate separately. In an example, if there is one-to-one correspondence between the PDCCH candidates of two or more different sets of search spaces, the WTRU may first perform the channel estimation separately for each of the PDCCH candidates and then may add the received symbols of the corresponding PDCCH candidates together, or combine the soft decoding information of the corresponding PDCCH candidates, and then do the decoding and CRC check for the corresponding PDCCH candidates together. This method of combining the soft decoding information may be used if the set of bits that are sent over the corresponding PDCCHs are the same, which is the case if the DCI is the same for the corresponding PDCCH and the channel coding and CRC is the same for the corresponding PDCCH.

In another example, the same DCI may be transmitted over two or more PDCCHs on different CORESETs. In this case, the same DCI may be transmitted by two or more PDCCHs on different CORESETs for a WTRU. An indication of possible redundant transmissions may be included in the CORESET configuration or the configuration of the search spaces (e.g., via RRC signaling) or the physical broadcast channel (PBCH). The multiple CORESETs containing the multiple PDCCHs transmitting the same DCI may be on the same or different BWPs.

In another example, the multiple CORESETs containing the multiple PDCCHs transmitting the same DCI may be on different OFDM symbols. In this case, the CORESETs and the PDCCH candidates carrying that DCI may be associated with different beams. In addition, the CORESETs containing the PDCCHs may have different or the same mode of transmission (e.g., interleaved vs non-interleaved).

In the case of the same DCI being transmitted over multiple PDCCHs on the same CORESET, the WTRU may assume that the DMRS antenna port associated with multiple PDCCHs are quasi co-located with respect to delay spread, Doppler spread, Doppler shift, average delay, and/or spatial reception (Rx) parameters. In the case of multiple PDCCHs transmitted on different CORESETs, the WTRU may not assume that the DMRS antenna port associated with multiple PDCCHs are quasi co-located with respect to delay spread, Doppler spread, Doppler shift, average delay, and/or spatial Rx parameters. In the latter case, the WTRU may perform channel estimation individually on each PDCCH.

In the case of the WTRU receiving the same DCI over multiple PDCCHs (e.g., the same downlink allocation or uplink grant), the WTRU may monitor a set of PDCCH candidates within the same or multiple search spaces. If the CRC scrambled by cell RNTI (C-RNTI) was checked for one of the PDCCH candidates, the WTRU may continue monitoring for other PDCCH candidates with CRC scrambled by an identical WTRU-specific C-RNTI. In this scenario, the WTRU may use detected DCIs over multiple PDCCHs with the identical C-RNTI to improve the control channel detection reliability. In the case of the same DCI being transmitted on multiple PDCCHs, the WTRU may receive one PDCCH on the common search space and another PDCCH on a WTRU-specific search space, even in the case that the CRC for multiple PDCCHs is scrambled by an identical WTRU-specific C-RNTI.

In another example, PDCCH repetition may be implemented through multi-CORESET search spaces. For example, in order to facilitate scheduling and blind detection of repeated DCI, the WTRU may be configured with a search space that is associated with multiple CORESETs. A search space may be configured semi-statically through higher layer signaling (e.g. RRC) by a set of parameters, such as the associated CORESET. In an example method, multiple CORESETs may be associated with one search space (or one set of search spaces), and each index of the corresponding hashing function may be associated with multiple PDCCH candidates (e.g., one from each CORESET). The linked PDCCH candidates (on different CORESETs) may be used to repeat the same control information (DCI). At the receiver, the WTRU may blindly detect its PDCCH by first combining the linked PDCCH candidates from different CORESETs (based on its search space or set of search spaces) and then decode the linked PDCCH candidates and check CRC. In an example, the WTRU may decode each PDCCH candidate separately (and check CRC of each candidate separately). Separate decoding of the corresponding PDCCH candidates may provide enhanced reliability through multiple trials.

In PDCCH repetition through multi-CORESET search spaces, the CORESET-related bit field of the search space configuration may indicate a combination of CORESETs (e.g., instead of one CORESET). An example of an indication of a combination of CORESETs is to use 12 bits to indicate the association of a subset of the configured CORESETs to a search space (or a set of search spaces), for example in place of the current parameter ControlResourceSetId (or "CORESET-ID") in 5G NR. The mapping of the CORESET-related bits in the search space configuration to the subset of CORESETs may be pre-specified in the standard specifications as a table or may be indicated as the inclusion/exclusion of the ith CORESET using 0 or 1 as the ith bit index (i from 0 to 11) in the CORESET-related bit field of the search space configuration.

In another example, undefined cases of CORESET ID may be used to define combinations of multiple CORESETs. For example, when at most 12 CORESETs (0-11) are defined and 4 bits are used for indicating ControlResourceSetId (or "CORESET-ID") in the configuration of search space, the last four values (12-15) may be used to indicate a pair of CORESETs, as shown in Table 1.

TABLE 1

An example of a ControlResourceSetID parameter including multi-CORESET options for search space configuration

| ControlResourceSetID | Associated CORESET or pairs of CORESETs |
| --- | --- |
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| 11 | 11 |
| 12 | 1, 2 |
| 13 | 1, 4 |
| 14 | 1, 7 |
| 15 | 1, 10 |

Figure 7:
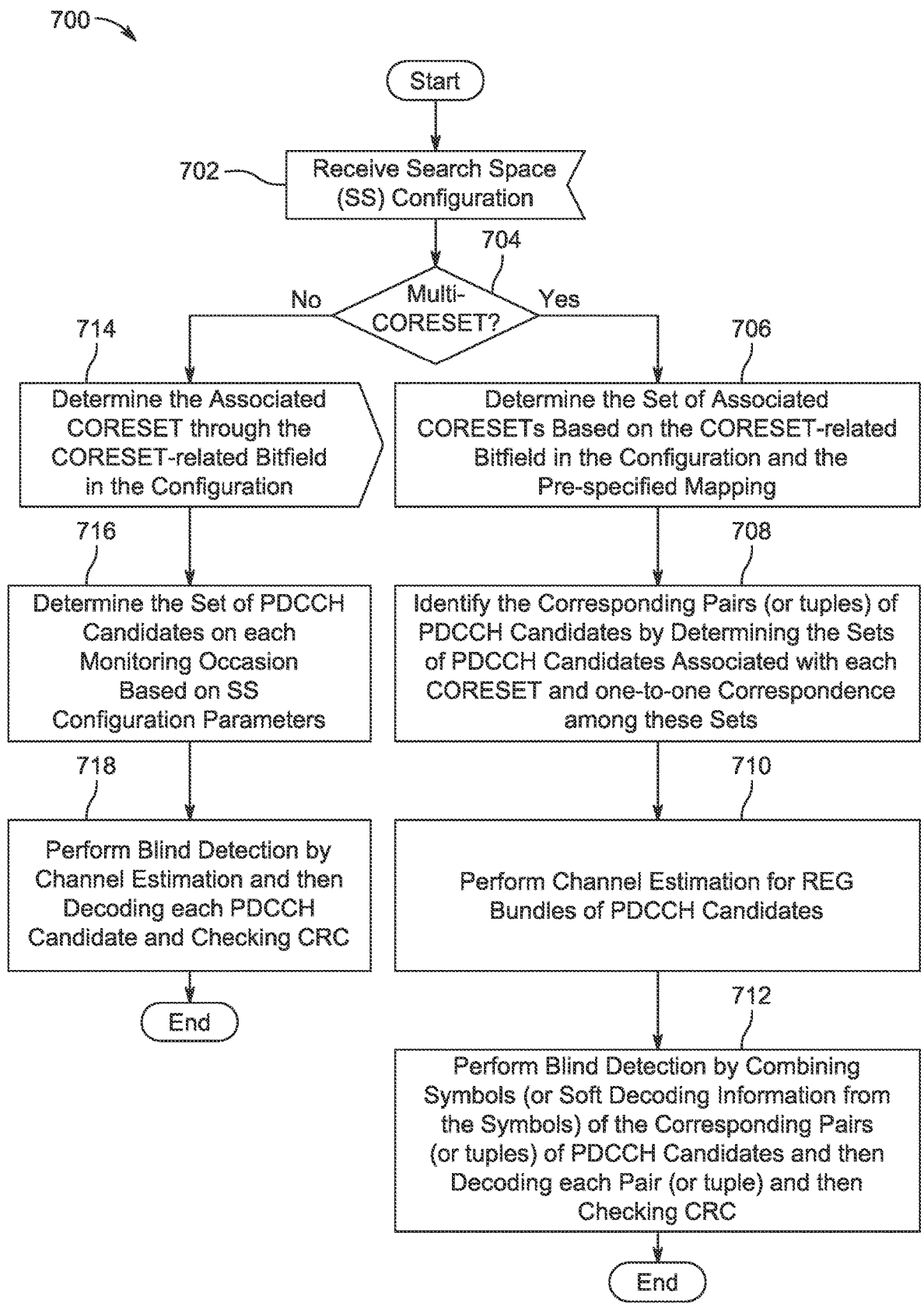
FIG. 7 shows a flow diagram of an example WTRU procedure for PDCCH repetition through multi-CORESET search spaces together with soft combination for blind detection.

FIG. 7 shows a flow diagram of an example WTRU procedure 700 for PDCCH repetition through multi-CORESET search spaces together with soft combination for blind detection. After receiving search space (SS) configuration 702 (e.g., through RRC or other higher layer signaling), a WTRU may determine, at 704, if the configured search space is single-CORESET or multi-CORESET. For example, the WTRU may make the determination based on a received flag (indicator) bit (e.g., received in the search space configuration) or implicitly based on the number of CORESET-related bits in the search space configuration (e.g., default may be a single-CORESET search space).

If the WTRU identifies a multi-CORESET search space, then at 706 the WTRU may determine the associated CORESETs based on the CORESET-related bits of the search space configuration and a pre-specified mapping (e.g., based on the standard specifications). At 708, the WTRU may determine the corresponding pairs (or tuples) of PDCCH candidates that are supposed to carry the same DCI (one on each CORESET) by determining the sets of PDCCH candidates associated with each CORESET and the one-to-one correspondence among the PDCCH candidates in those sets. For blind detection, at 710, the WTRU may perform channel estimation for each REG bundle of PDCCH candidates separately. At 712, the WTRU may perform blind detection for each corresponding pair (or tuple) of PDCCH candidates by combining symbols (or soft decoding information from the symbols) of the PDCCH candidates belonging to the pair (or tuple) and decoding each pair (or tuple) and checking the CRC.

If the WTRU identifies a single-CORESET search space, then at 714 the WTRU may determine the associated CORESET through the CORESET-related bit filed in the SS configuration. At 716, the WTRU may determine the set of PDCCH candidates on each monitoring occasion based on the SS configuration parameters. At 718, the WTRU may perform blind detection by performing channel estimation and decode each PDCCH candidate and checking CRC.

Joint redundancy may be used for multiple DCIs intended for a URLLC WTRU. As discussed in examples above, multiple DCIs may be intended for the same WTRU, corresponding to multiple streams or layers of data. In this case, in addition or alternatively to repeating each DCI on multiple PDCCHs, enhanced reliability through redundancy may be achieved using joint redundancy for the multiple DCIs. To achieve joint redundancy, network coding schemes may be used to enhance reliability. For example, if two DCIs A and B have the same size and DCI A is sent by a first PDCCH to the WTRU and DCI B is sent by a second PDCCH to the WTRU, then DCI+DCI B (e.g., added as an XOR operation) may be transmitted by a third PDCCH to the same WTRU to increase reliability.

Dropping rules may be designed to satisfy the limits on blind decoding by WTRU. In 5G NR, as well as LTE, limits on the maximum number of blind decodes in a time slot may be assumed for a WTRU. To limit the complexity of channel estimation by the WTRUs, the number of CCEs that are covered by the PDCCH candidates that a WTRU may blindly decode in a slot may be limited. The inherent randomness of hashing functions that specify the sets of search spaces for a WTRU may make the number of covered CCEs (or the number of CCEs in the footprint of the sets of search spaces for that WTRU) variable. Having different types of PDCCHs with different possible monitoring rates may result in a fluctuation of the number of PDCCH candidates to be blindly decoded. Therefore, limiting the parameters for the sets of search spaces such that the number of blind decodes and the number of covered CCEs remain in an appropriate range for all conditions may be prohibitive.

In an example, the search space parameters may be designed such that the limits on the number of candidates and the number of covered CCEs are satisfied with a high probability. For the low-probability cases that exceed the limits, rules may be set to drop some of the PDCCH candidates from the blind decoding process to satisfy the hard limits. Dropping rules may be based on a number of factors and variables. For example, dropping rules may be fixed rules that are specified by the technical specification and/or semi-static rules that are configured by higher layer signaling (e.g. RRC). The dropping rules may be based on a hierarchy of priorities for different types of PDCCHs, monitoring occasions and/or other parameters. The rules for dropping a PDCCH candidate from the blind decoding may be based on the PDCCH candidate's aggregation level (e.g., having lowest priority compared to other PDCCH candidates). The dropping rules and the associated order of priorities may be based on a combination of different properties, such as those properties discussed above. The WTRU and/or the gNB may have knowledge of the dropping rules, to prevent the WTRU from performing a blind search on the dropped PDCCH candidate and/or the gNB scheduling a dropped PDCCH candidate. In an example, a fixed set of dropping rules may be used, and/or multiple sets of dropping rules may be used, such that one dropping rules set may be semi-statically chosen or configured by the gNB, and the WTRU is informed of the chosen dropping rules set through mechanisms such as RRC configuration of CORESETs or search spaces.

An example hierarchy of priorities for different CORE-SETs and PDCCH candidates with different aggregation levels inside each CORESET may be as follows: (1) All PDCCH candidates on single-symbol CORESETs on the first OFDM symbol of the slot; (2) All PDCCH candidates on single-symbol CORESETs on the other OFDM symbols of the slot; and (3) PDCCH candidates on multi-symbol CORESETs with smaller candidates (with smaller aggregation levels) having higher priority.

In an example, the rules for dropping a PDCCH candidate from the blind search may be based on the number of CCEs that are not non-overlapping with CCEs of the other PDCCH candidates of the set of search spaces. In other words, the PDCCH candidate(s) for which removal will result in the most number of CCEs being removed from the pool for channel estimation may be chosen to be dropped from the blind search. In the case that multiple PDCCH candidates with same metric are identified, their index in the search space may dictate their precedence.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU) comprising:
   a processor; and
   a transceiver;
   the processor and the transceiver configured to receive configuration information defining a first search space set and a second search space set, the first search space set comprising a first plurality of physical downlink control (PDCCH) candidates, the second search space set comprising a second plurality of PDCCH candidates, wherein the configuration information includes information indicating that the first search space set and the second search space set are linked, and wherein a number of the first plurality of PDCCH candidates is the same as a number of the second plurality of PDCCH candidates; and
   the processor and the transceiver configured to receive downlink control information (DCI) by:
      monitoring, based on the received configuration information, for a first transmission of the DCI using at least one of the first plurality of PDCCH candidates
      monitoring, based on the received configuration information, for a second transmission of the DCI using at least one of the second plurality of PDCCH candidates; and
      decoding the DCI using any of the first transmission or the second transmission.

2. The WTRU of claim 1, wherein the processor and the transceiver are further configured to receive the DCI by combining information of the first transmission with information of the second transmission.

3. The WTRU of claim 1, wherein:
   the first search space set is associated with an aggregation level, and the second search space set is associated with an aggregation level that corresponds to the aggregation level associated with the first search space set.

4. The WTRU of claim 1, wherein the configuration information indicates that each of the first plurality of PDCCH candidates is linked to a respective one of the second plurality of PDCCH candidates.

5. The WTRU of claim 1, wherein the first search space set is associated with a first control resource set (CORESET) and the second search space set is associated with a second CORESET.

6. The WTRU of claim 1, wherein the first transmission and the second transmission are received using different beams.

7. A method, performed by a wireless transmit/receive unit (WTRU), for receiving downlink transmissions, the method comprising:
receiving configuration information defining a first search space set and a second search space set, the first search space set comprising a first plurality of physical downlink control (PDCCH) candidates, the second search space set comprising a second plurality of PDCCH candidates, wherein the configuration information includes information indicating that the first search space set and the second search space set are linked, and wherein a number of the first plurality of PDCCH candidates is the same as a number of the second plurality of PDCCH candidates; and
receiving downlink control information (DCI) by:
monitoring, based on the received configuration information, for a first transmission of the DCI using at least one of the first plurality of PDCCH candidates;
monitoring, based on the received configuration information, for a second transmission of the DCI using at least one of the second plurality of PDCCH candidates; and
decoding the DCI using any of the first transmission or the second transmission.

8. The method of claim 7, further comprising receiving the DCI by combining information of the first transmission with information of the second transmission.

9. The method of claim 7, wherein:
the first search space set is associated with an aggregation level,
and the second search space set is associated with an aggregation level that corresponds to the aggregation level associated with the first search space set.

10. The method of claim 7, wherein the configuration information indicates that each of the first plurality of PDCCH candidates is linked to a respective one of the second plurality of PDCCH candidates.

11. The method of claim 7, wherein the first search space set is associated with a first control resource set (CORESET) and the second search space set is associated with a second CORESET.

12. The method of claim 7, wherein the first transmission and the second transmission are received using different beams.

13. A base station comprising:
a processor; and
a transceiver;
the processor and the transceiver configured to transmit configuration information defining a first search space set and a second search space set, the first search space set comprising a first plurality of physical downlink control (PDCCH) candidates, the second search space set comprising a second plurality of PDCCH candidates, wherein the configuration information includes information indicating that the first search space set and the second search space set are linked, and wherein a number of the first plurality of PDCCH candidates is the same as a number of the second plurality of PDCCH candidates; and
the processor and the transceiver configured to send downlink control information (DCI) by:
transmitting a first transmission of the DCI using at least one of the first plurality of PDCCH candidates; and
transmitting a second transmission of the DCI using at least one of the second plurality of PDCCH candidates, wherein, in accordance with the configuration information indicating that the first search space set and the second search space are linked, the first transmission of the DCI includes the same control information as the second transmission of the DCI.

14. The base station of claim 13, wherein:
the first search space set is associated with an aggregation level,
and the second search space set is associated with an aggregation level that corresponds to the aggregation level associated with the first search space set.

15. The base station of claim 13, wherein the configuration information indicates that each of the first plurality of PDCCH candidates of the first search space set is linked to a respective one of the second plurality of PDCCH candidates.

16. The base station of claim 13, wherein the first search space set is associated with a first control resource set (CORESET) and the second search space set is associated with a second CORESET.

17. The base station of claim 13, wherein the first transmission and the second transmission are transmitted using different beams.

18. The base station of claim 13, wherein the first transmission and the second transmission are transmitted using different orthogonal frequency division multiplexing (OFDM) symbols.

19. The base station of claim 13, wherein the first search space set is associated with a first control resource set (CORESET) and the second search space set is associated with a second CORESET.

* * * * *